United States Patent
Payne et al.

(10) Patent No.: US 11,437,155 B2
(45) Date of Patent: Sep. 6, 2022

(54) THREE DIMENSIONAL PRINTED PRECISION MAGNETS FOR FUEL ASSEMBLY

(71) Applicant: WESTINGHOUSE ELECTRIC COMPANY LLC, Cranberry Township, PA (US)

(72) Inventors: Nathan J. Payne, West Columbia, SC (US); Jeffrey M. McCarty, Cayce, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1069 days.

(21) Appl. No.: 15/896,473

(22) Filed: Feb. 14, 2018

(65) Prior Publication Data

US 2018/0254112 A1 Sep. 6, 2018

Related U.S. Application Data

(60) Provisional application No. 62/464,457, filed on Feb. 28, 2017.

(51) Int. Cl.
*G21C 3/33* (2006.01)
*G21C 3/334* (2006.01)
(Continued)

(52) U.S. Cl.
CPC .............. *G21C 3/334* (2013.01); *G21C 3/33* (2013.01); *G21C 3/331* (2013.01); *G21C 3/3305* (2013.01);
(Continued)

(58) Field of Classification Search
CPC ... G21C 3/00; G21C 3/02; G21C 3/04; G21C 3/30; G21C 3/32; G21C 3/33;
(Continued)

(56) References Cited

U.S. PATENT DOCUMENTS

| 4,492,668 A | * | 1/1985 | Pilgrim, Jr. | ............ | G21C 3/326 376/440 |
| 5,490,191 A | * | 2/1996 | Christiansen | ............ | G21C 3/32 376/434 |

(Continued)

FOREIGN PATENT DOCUMENTS

| JP | H08297185 A | 11/1996 |
| RU | 2360310 C1 | 11/2007 |

OTHER PUBLICATIONS https://web.archive.org/web/20160803015726/https://catalog.polymagnet.com/magnet-technical-information (Year: 2016).*

(Continued)

*Primary Examiner* — Jack W Keith
*Assistant Examiner* — Jinney Kil
(74) *Attorney, Agent, or Firm* — K&L Gates LLP

(57) ABSTRACT

An improved retention and alignment system for nuclear fuel rods includes an upper nozzle plate and a lower nozzle plate, nuclear fuel rods, each having an upper end and a lower end and extending axially between the upper and lower nozzle plates, a first precision magnet incorporated onto the lower end of the fuel rod, and a plurality of second precision magnets incorporated onto the lower nozzle plate in positions confronting the first precision magnets on the fuel rods. Each first precision magnet has at least one of a magnetic north or south polarity and the second precision magnet has at least one of a magnetic south or north polarity opposite the polarity of the confronting first precision magnet to effect magnetic attraction between the confronting first and second precision magnets. Grids between the upper and lower nozzle plates form cells through which the fuel rods pass. Precision magnets of the same polarity may be positioned laterally along the fuel rods and grid walls in positions confronting each other to repel the fuel rods from (Continued)

the grid walls to maintain fuel rod alignment and prevent contact between the fuel rods and the grids.

21 Claims, 12 Drawing Sheets

(51) Int. Cl.
    *G21C 3/34*     (2006.01)
    *G21C 3/356*     (2006.01)

(52) U.S. Cl.
    CPC ............. *G21C 3/3315* (2013.01); *G21C 3/34* (2013.01); *G21C 3/356* (2013.01)

(58) Field of Classification Search
    CPC . G21C 3/3305; G21C 3/331; F05B 2230/604; F16B 2001/0035; H01F 7/0247
    USPC .................................. 376/364, 451
    See application file for complete search history.

(56) References Cited

U.S. PATENT DOCUMENTS

| | | | |
|---|---|---|---|
| 5,878,100 A * | 3/1999 | Johannesson | G21C 3/328 376/435 |
| 6,929,291 B2 * | 8/2005 | Chen | E05C 19/16 292/251.5 |
| 8,179,219 B2 | 5/2012 | Fullerton et al. | |
| 8,353,544 B2 * | 1/2013 | Fiedler | E05B 15/04 292/318 |
| 9,219,403 B2 | 12/2015 | Evans | |
| 9,245,677 B2 | 1/2016 | Fullerton et al. | |
| 9,404,776 B2 | 8/2016 | Fullerton et al. | |
| 2007/0183556 A1 * | 8/2007 | Labarriere | G21C 3/322 376/440 |
| 2008/0101528 A1 * | 5/2008 | Friedrich | G21C 5/06 376/439 |
| 2010/0034337 A1 * | 2/2010 | Verdier | G21C 3/3206 376/439 |
| 2013/0000084 A1 * | 1/2013 | Nassar | H01F 7/0252 24/303 |
| 2017/0117065 A1 * | 4/2017 | Scott | G21C 17/10 |

OTHER PUBLICATIONS

Polymagnet, Smart Magnets for Precision Alignment; 2015 Correlated Magnetics Research.

* cited by examiner

THREE DIMENSIONAL PRINTED PRECISION MAGNETS FOR FUEL ASSEMBLY

BACKGROUND OF THE INVENTION

1. Field of the Invention

The present invention relates to retention systems for nuclear fuel rods, and more particularly to magnetic retention systems.

2. Description of the Prior Art

In conventional nuclear reactor systems, the fuel rods are held in position axially and laterally with mechanical components such as springs, braces, end plugs, and other devices positioned along the length and at each end of a fuel rod. Such traditional means of retention and alignment sacrifice system pressure without providing a corresponding thermal efficiency benefit. The flow of fluid coolant around the fuel rods past the mechanical retention and alignment components reduces the coolant pressure causing a pressure drop in the coolant flow.

Further, the retention and alignment components may cause wear of the fuel rods due to contact between the structural retention features and the fuel, which may lead to fuel rod damage.

Elimination of these retention and alignment contact features would eliminate or reduce the coolant pressure drop. Avoiding loss of pressure would increase fuel efficiency.

SUMMARY OF THE INVENTION

The problems associated with physical contact-based retention and alignment features are addressed by the system for retention and alignment of nuclear fuel rods described herein wherein retention is achieved by magnetizing certain contacts between adjacent components. Magnetization may be achieved by using precision magnets keyed to the polarity of confronting precision magnets.

An improved retention and alignment system for nuclear fuel rods may, in various aspects, include an upper plate and a lower nozzle, at least one nuclear fuel rod having an upper end and a lower end and extending axially between the upper and lower nozzles, a first precision magnet incorporated onto the lower end of the at least one fuel rod, and, a second precision magnet incorporated onto the lower nozzle in a position confronting the at least one first precision magnet. The first precision magnet has at least one of a magnetic north or south polarity and the second precision magnet has at least one of a magnetic south or north polarity opposite the polarity of the confronting first precision magnet to effect magnetic attraction between the confronting first and second precision magnets.

In various aspects, there is a first precision magnet incorporated onto the lower ends of the at least one fuel rod and a second precision magnet incorporated onto the lower nozzle to axially retain the fuel rod between the upper and lower nozzles by magnetic attraction.

In various aspects of the system, each of the at least one first and second precision magnets has at least one, and in certain aspects, two or more, paired sections. Each paired section has a polarity opposite the other section in the pair. The paired sections may be configured in a locked configuration wherein confronting precision magnet sections attract each other to an unlocked configuration wherein confronting precision magnet sections repel each other.

In various aspects, the polarity of each member of the pair may be selectively switchable, for example by rotation, to the opposite polarity to selectively switch one of the first or second precision magnets from the locked configuration to the unlocked configuration. In various aspects of the system, the paired sections of at least one of the first and second precision magnets may be rotatable for rotating the paired sections of one of the first and second magnets into the locked or the unlocked configuration.

The improved retention and alignment system may address problems of maintaining fuel rod alignment during seismic events. The system may include at least one grid substantially parallel to and positioned between the upper and lower nozzles. The at least one grid defines a perimeter and has within the perimeter, a first set of grid strap extending laterally and longitudinally across the grid to define at least one, and in various aspects, multiple cells. Each cell has an interior and an exterior, wherein one of the at least one fuel rods passes axially through the interior of one cell. The grid strap walls of the grid may include at least one third precision magnet incorporated onto the interior of the cell. At least one fourth precision magnet may be incorporated onto a side of the fuel rod, fuel rod cladding, or a sleeve over the fuel rod in a position confronting the at least one third precision magnet. The third precision magnet has at least one of a magnetic north or south polarity and the fourth precision magnet has at least one of a magnetic north or south polarity the same as the polarity of the confronting third precision magnet to effect magnetic repulsion between the confronting third and fourth precision magnets for maintaining a gap between the fuel rod and the grid strap onto which the confronting third precision magnet is incorporated.

The system may have in certain aspects, a plurality of cells and a plurality of fuel rods, wherein each cell is sized to receive one of the plurality of fuel rods extending axially therethrough.

In various aspects, each enclosure through which a fuel rod passes has at least two third precision magnets incorporated onto different grid strap walls of the enclosure and the fuel rod (or its cladding or sleeve) has at least two fourth precision magnets. Each fourth precision magnet is positioned on the fuel rod to confront a different one of the at least two third precision magnets incorporated onto the grid strap walls.

BRIEF DESCRIPTION OF THE DRAWINGS

The characteristics and advantages of the present disclosure may be better understood by reference to the accompanying figures.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Figure 1:
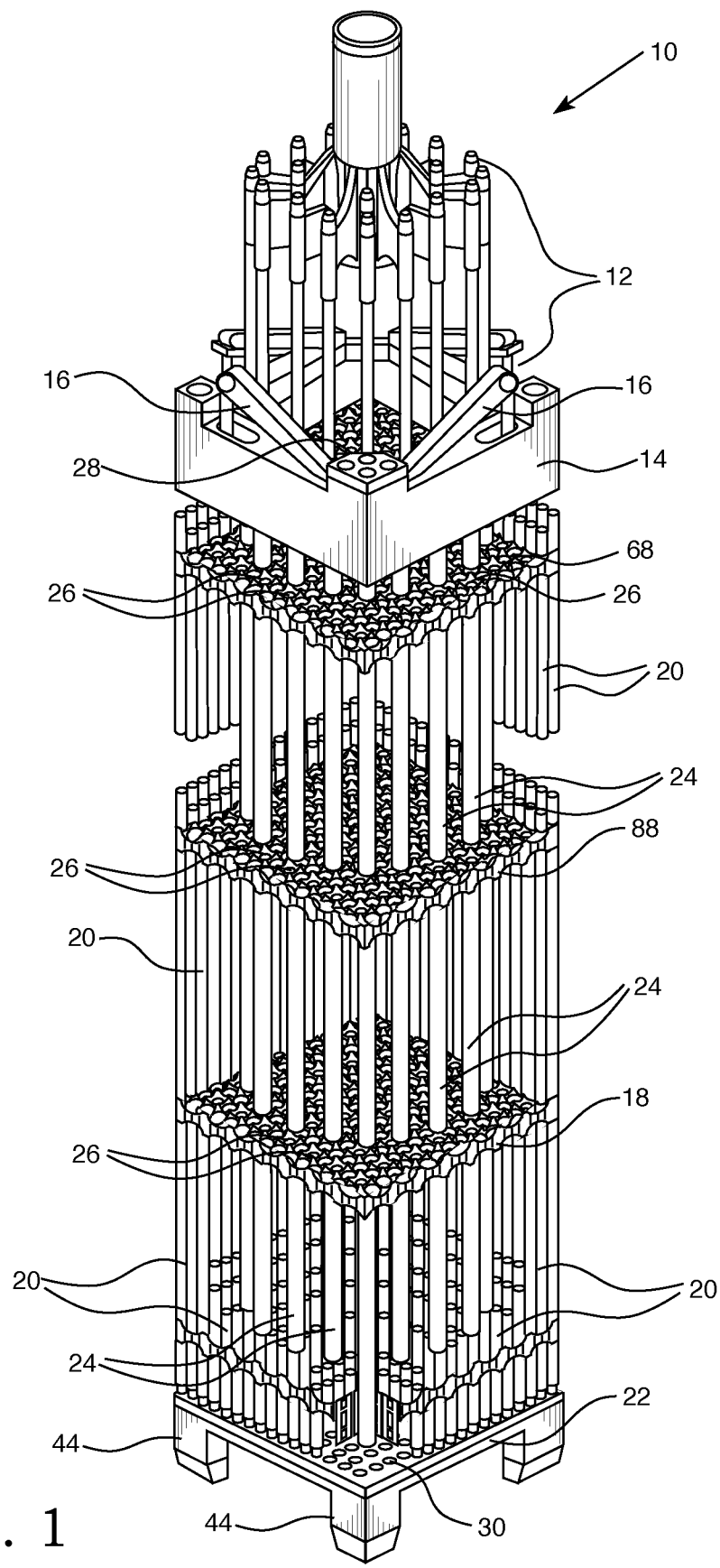
FIG. 1 is a cut-away perspective view of some of the components of a conventional fuel assembly showing a control rod assembly, a top nozzle, several grid layers, a bottom nozzle, fuel rods and grid sleeves.

An exemplary nuclear reactor fuel rod and coolant system 10 is shown in part in FIG. 1. The system 10 includes a control rod assembly 12 positioned at the upper end of the system 10, a top nozzle 14 with leaf springs 16, a top nozzle plate 28, a bottom nozzle 22, bottom nozzle plate 30, and several grids 68, 88, and 18 positioned between the top and bottom nozzle plates 28, 30 to support rows of fuel rods 20 extending between the top and bottom nozzles plates 28, 30. The plurality of grids 68, 88, and 18 are substantially parallel to, but separated from each other, and supported by support rods 24, sometimes referred to as guide thimbles, positioned inside the grid perimeter and inside several rows of fuel rods 20. Cut-away sections of FIG. 1 show a pattern of holes 26 through each of a top grid 68, mid-grid 88, and bottom grid 18 through which the fuel rods 20 pass from the bottom nozzle plate 30 to the top nozzle plate 28. Holes 26 are sized to allow coolant fluid flow around the fuel rods 20. Additional openings, for example, venturi openings, may be formed in the top and bottom nozzles plates 28, 30. The system 10 is enclosed in a reactor housing (not shown).

As stated above, in conventional nuclear reactor systems, the fuel rods 20 are held in position laterally with springs 48 and/or dimples 58 on the inner sides of the grids 68, 88, and 18. In a typical conventional system, each cell has two dimples and two springs. Both the dimples and the springs arch into the cell from the grid strap wall forming raised portions 56 for contact with the fuel rod 20. The more flexible spring 48 forces the fuel rod against the raised portion 56 of the dimple 58 to laterally secure the rod within the cell. The flow of fluid coolant around the fuel rods 20 past the springs 48 and other retention features to retain the fuel rods 20 and supports 24 in position reduces the coolant pressure causing a pressure drop in the coolant flow.

In the retention system described herein, fuel rods 20 are held in position using keyed patterns of confronting precision magnets. The methods of axial and lateral fuel rod retention described herein provides opportunities to eliminate components, reduce aforementioned pressure drop, and improve grid to rod fretting (e.g., reduce or eliminate wear of the fuel rods due to contact with structural retention features of the grid). By incorporating a means of dampening or preventing adjacent fuel assembly impact with features of grids 68, 88, and 18, the improved retention and alignment system will reduce seismic forces on the fuel assemblies and reduce, and preferably, eliminate the risk of associated loss-of-coolant accidents. The improved retention and alignment system will also prevent fuel assembly lift off at the axial retention features, and allow for easier removal of components for reconstitution, repair or replacement.

Figure 2A:
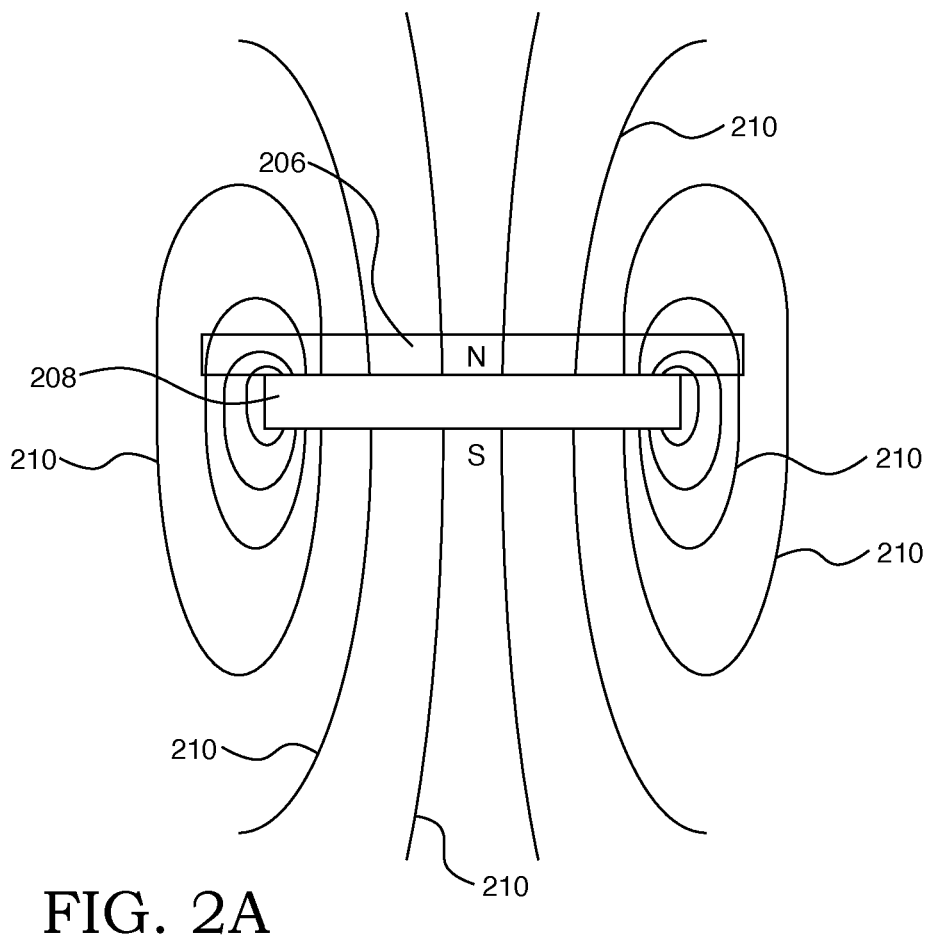
FIGS. 2A and 2B illustrate the difference between the magnetic field lines in a conventional magnet A and a precision magnet B, showing the loss experienced with conventional magnets.
Figure 2B:
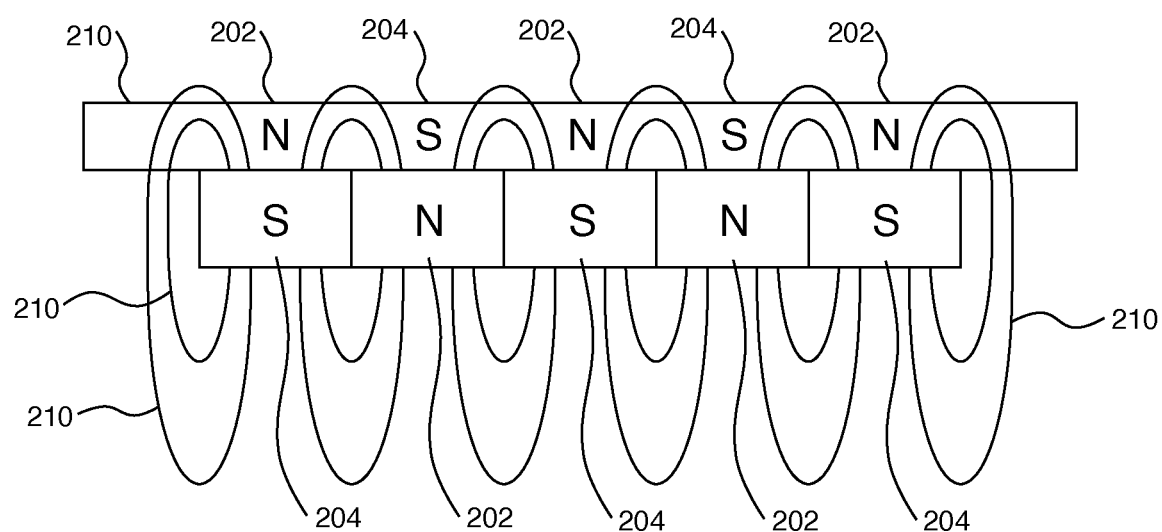

Precision magnets are fundamentally different than conventional magnets. Most off the shelf conventional magnets have a simple configuration: a north pole on one side and a south pole on the other. Software-driven magnetizers, such as those sold under the mark, POLYMAGNETS®, by Correlated Magnetics Research LLC of California, USA, have been commercially developed that enable manufacture of customizable patterns of magnetism designed in software and programmed into a magnet. See, for example, U.S. Pat. Nos. 8,179,219; 9,219,403; 9,245,677 and 9,404,776, incorporated in relevant part herein by reference. These precision magnets can be up to five times stronger than conventional magnets because their magnetic energy may be concentrated near the surface, as shown in FIGS. 2A and 2B. 3-D printed precision magnet technology is an emerging field that prints individual (digital/pixelated) magnetic poles into customizable orientations and 3-D geometries. This ability to print small field magnetic circuits allows for increased magnetic forces over a smaller distance due to the reduced energy loss of the field. Conventional magnets 206, 208 as shown in FIG. 2A do not necessarily align when attaching to each other. The magnetic field lines 210 of conventional magnets 206, 208 show that much of the magnetic energy is lost, directed away from the magnets 206, 208. Precision magnets, as shown in FIG. 2B, concentrate the magnetic field. The magnetic field lines 210 in the precision magnets 202, 204, form a smaller, tighter field so that the magnetic force remains with the magnets.

Precision magnets, such as those sold under the mark, POLYMAGNETS®, may be designed to align with a wide variety of alignment functions. Latch precision magnets, for example, are designed to repel until the magnet pair pass through a defined transition point. After the transition point they are designed to reverse polarity and attract. Spring precision magnets are designed to attract until they pass through a defined transition point, past which they will repel. These precision magnets will come to rest at an equilibrium distance. At equilibrium, the opposing precision magnets maintain a predetermined distance from each other so that the components into which the precision magnets are placed can be held apart, spaced from each other at or about the predetermined distance.

Figure 3:
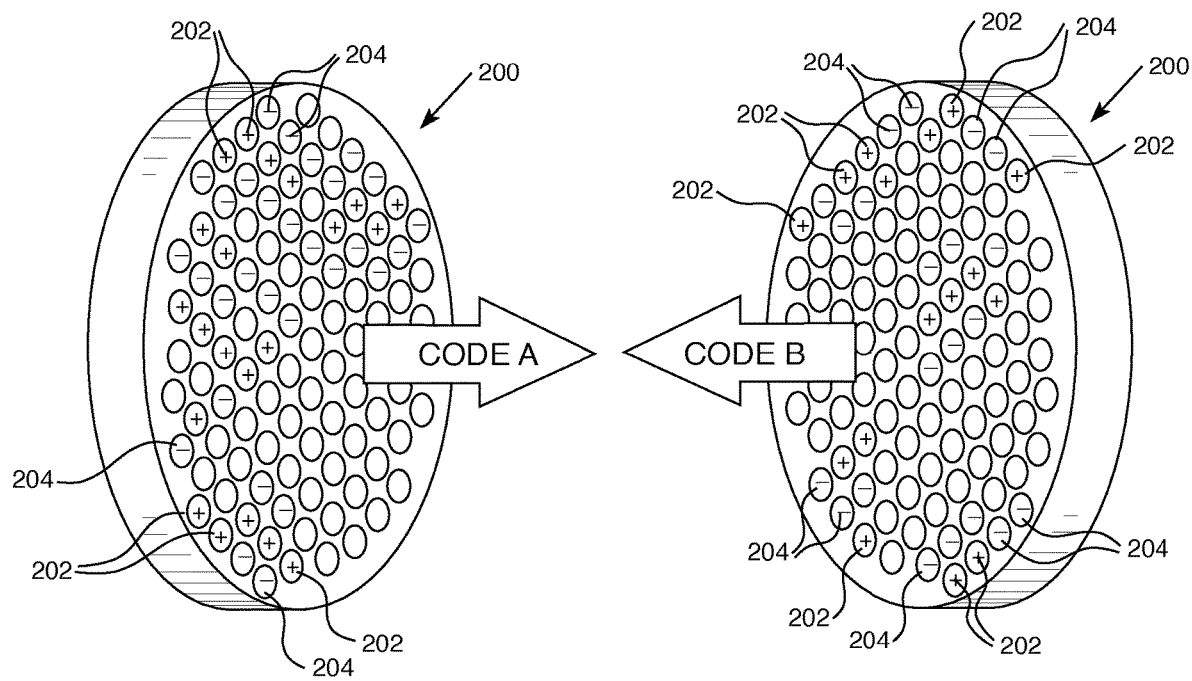
FIG. 3 is a view of prior art precision magnets with a patterned printed "locking/resistance" design, showing positive and negative poles distributed over the surface of the magnets.
Figure 4:
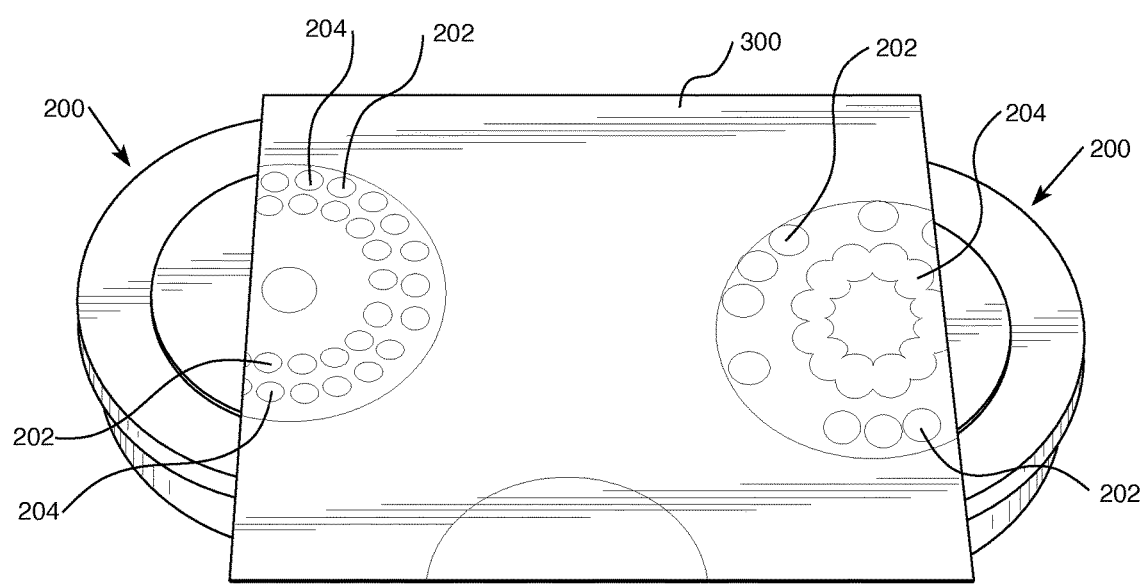
FIG. 4 is a view of the magnetic fields visible under a magnetic film showing positive and negative poles patterned over the surface of prior art discs.

Referring to FIGS. 3 and 4, variations in precision magnet configurations are shown for illustration purposes. In FIG. 3, two opposing discs 200 are shown having a plurality of precision magnets on each disc keyed to the precision magnets on the confronting disc. Precision magnets having, for example, a north magnetic pole 202 are shown with a plus sign and precision magnets having a south magnetic pole 204 are shown with a negative sign. When discs A and B are moved toward each other, they can be aligned so that the north (+) poles on disc A directly align with the south (−) poles on disc B, and the south (−) poles on disc A align with the north (+) poles on disc B, forcing the discs A and B to attract and join together. Because of the tight magnetic field, as shown in FIG. 2B, the force of attraction between discs A and B is very strong. If it is necessary or desirable to have the two discs 200 repel each other, the precision magnets 202, 204 on the discs 200 may be aligned so that the north (+) and south (−) poles on disc A align with the north (+) and south (−) poles, respectively, on disc B. The like magnetic poles on opposing discs will repel each other, forcing the discs A and B apart. In FIG. 3, an image of two discs 200 placed side-by-side show the magnetic fields of the discs through a sheath 300. The disc on the right side of the image has precision magnets having (+) poles 202 on the outer ring and precision magnets having (−) poles 204 in a center ring. The disc 200 on the left side of the image has precision magnets 202, 204 with alternating north (+) and south (−) poles, respectively. FIGS. 3 and 4 illustrate the possible geometries and patterns that may be used in configuring precision magnet retention assemblies.

Keyed confronting precision magnets for use in the environment of a nuclear fuel and coolant system 10 may be made of any suitable materials that are believed to retain their magnetic properties under reactor conditions. Research has shown that certain materials, such as Sm2Co17, have temperature and irradiation resistance with regard to degradation of magnetic properties.

The ability to axially secure and maintain the alignment of fuel rods 20 by means of a non-lateral contact method, such as by use of precision magnets, may make it possible to eliminate the bottom grid 88, and would significantly reduce pressure drop penalties in current fuel designs. The retention geometries may be magnetically keyed to allow for easy fuel rod 20 reconstitution.

Figure 5:
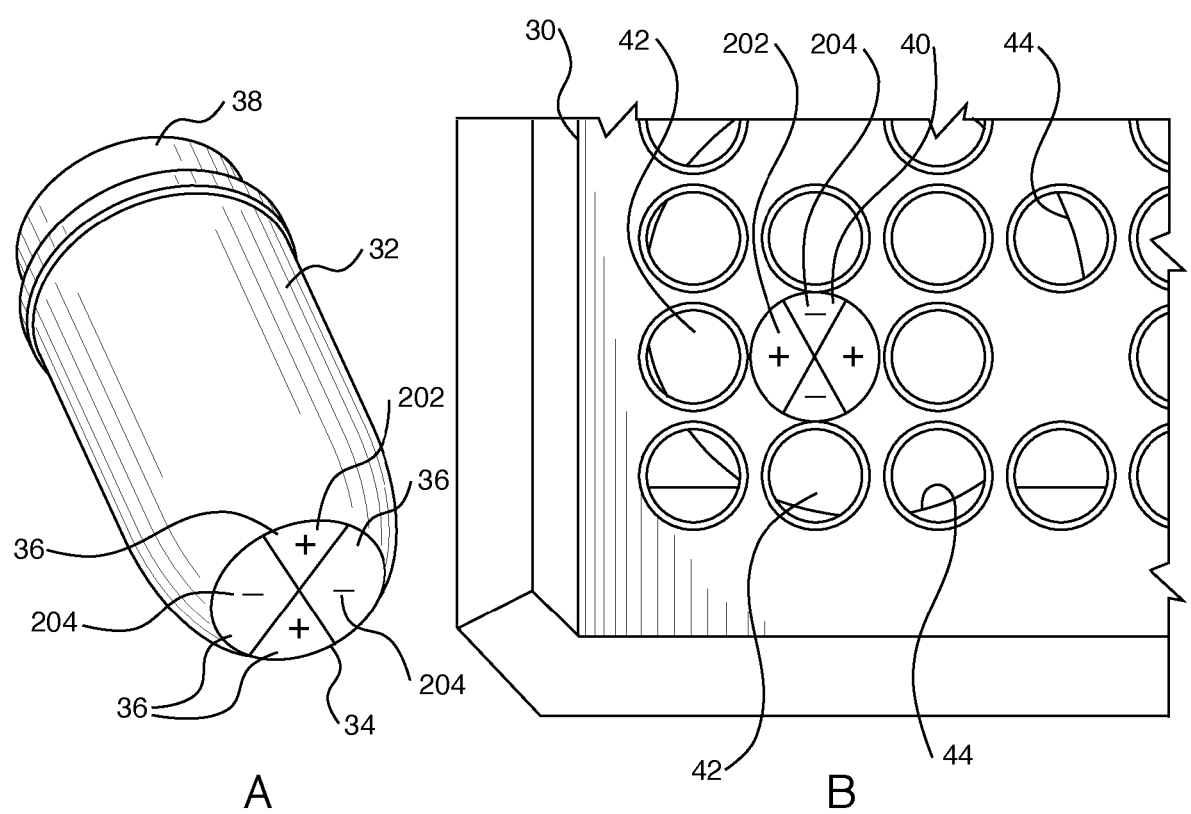
FIG. 5 shows (A) an end of a fuel rod having paired sections of precision magnets printed thereon, and (B) a bottom plate having a retention member comprised of paired sections of precision magnets opposite in polarity to the confronting fuel rod sections printed thereon for magnetically retaining the fuel rod (A) of FIG. 5.

Referring to FIG. 5 [A], part (A), a modification of the conventional end plug 32 design of a fuel rod 20 is shown. The end plug 32 includes a boss section 38 that is welded to one or both of the ends of a fuel rod 20 (not shown in this view). An end surface 34, for example, on the bottom end plug 32 may, in various aspects, have first precision magnets 36 incorporated on the surface 34. The first magnets may be a single magnet of a single polarity. As shown, in certain aspects, the first magnet may comprise paired sections of one or both positive and negative polarities, such as the alternating positive (+) 202 and negative (−) 204 pattern of poles shown on surface 34.

Figure 6:
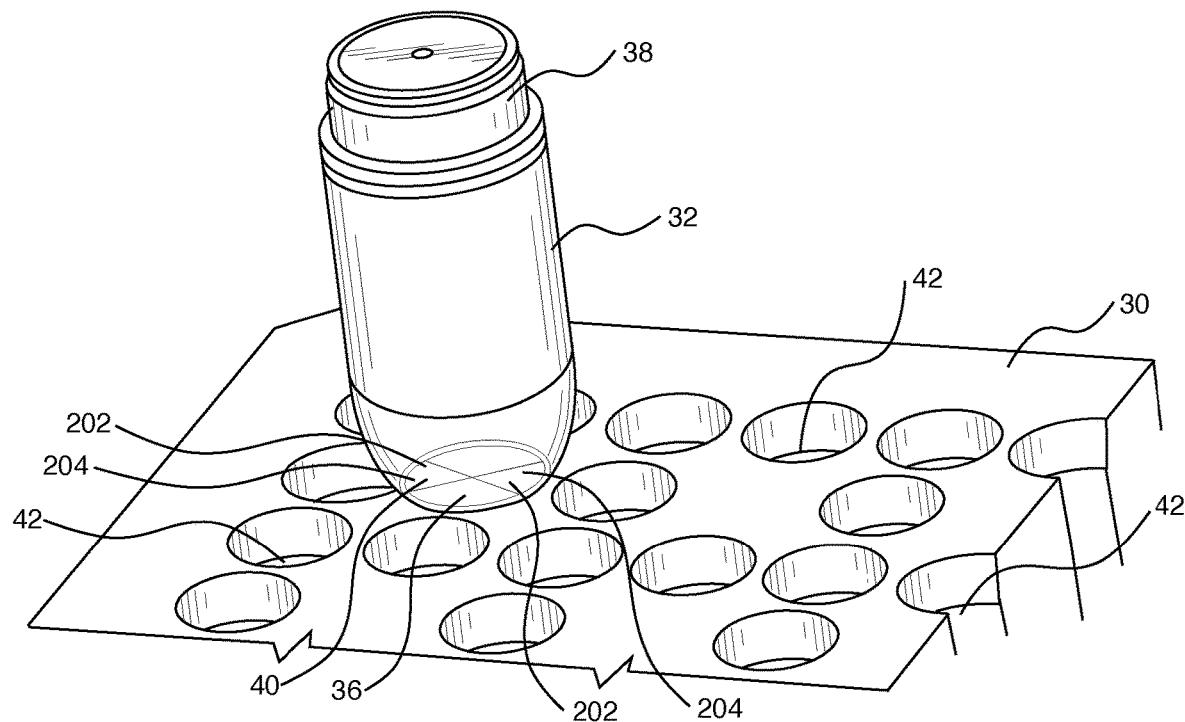
FIG. 6 is a view of the end of the fuel rod (A) of FIG. 5 [A] mating with the precision magnet retention member (B) of FIG. 5 in a locked position where confronting sections are of the opposite polarity.
Figure 7:
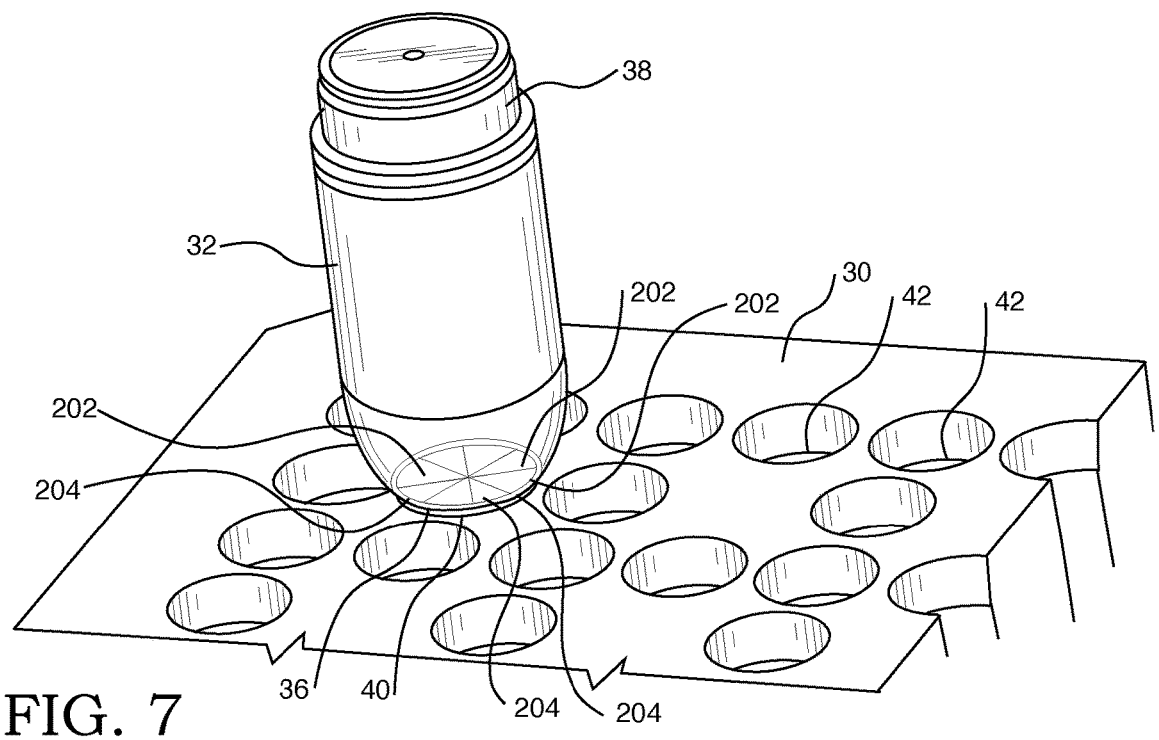
FIG. 7 is a view of the fuel rod and precision magnet retention member of FIG. 6 in an unlocked position where the confronting sections are of the same polarity.

FIG. 5[B], part (B) shows the bottom nozzle plate 30 including a plurality of holes 42 for passage of reactor coolant, such as water, around the fuel rods 20 and feet 44 for supporting the bottom nozzle plate 30. Bottom nozzle plate 30 further includes a second precision magnet 40 incorporated therein for each fuel rod 20 for alignment with the first precision magnet 36 on end surface 34 of end plug 32 of fuel rod 20. The second precision magnet 40 may be a single magnet of a single polarity opposite the polarity of the first single magnet 36, or may comprise paired sections of one or both positive and negative polarities, as shown in FIG. 5[B] part (B), able to be positioned or programmed such that the polarity of the paired sections on surface 34 are opposite the polarity of the paired sections on nozzle plate 30. The second precision magnet 40 includes alternating positive (+) 202 and negative (−) 204 poles that, when aligned in an orientation opposite that of the poles on the first precision magnet 36 on the end surface 34, exhibit strong magnetic attraction, locking the fuel rod 20 in position on bottom nozzle plate 30 when the two are brought into contact with each other, as shown in FIG. 6. In various aspects, a similar end surface with a precision magnet 36 may be incorporated on the upper end of the fuel rod 20 for magnetic attachment to a mating precision magnet 40 incorporated into the top nozzle plate 28. With precision magnets on the lower end of the fuel rods 20 in a confronting position relative to the bottom nozzle plate 30, the fuel rods 20 may be locked into axial alignment within the reactor system 10. When it is necessary to move a fuel rod 20, for example, to reconstitute, replace or repair it, one of the first or second precision magnets 36, 40 on the end of the fuel rod 20 is turned to position the positive (+) and negative (−) poles 202, 204 of one precision magnet 36 or 40 into alignment with the like poles of the opposing precision magnet 40 or 36 so that the bottom end surfaces of the fuel rod (or fuel rod end plug) and associated nozzle plate 30 repel each other, moving into an unlocked position, as shown in FIG. 7.

In certain aspects, each of the first and second precision magnets 36, 40 may be formed from a plurality of paired sections, wherein each section of a pair may have the same polarity as the other section of the pair or each section of a pair may have the opposite polarity of the other section of the pair. The polarity of each section may be selectively switchable to the opposite polarity to selectively switch one of the first or second precision magnets 36, 40 from the locked configuration wherein at least a majority of the confronting precision magnet sections attract each other to an unlocked position wherein at least a the majority of the confronting precision magnet sections repel each other. In this embodiment, the strength of the attractive or repelling force may be controlled by polarities of confronting sections of the precision magnets.

Figure 8:
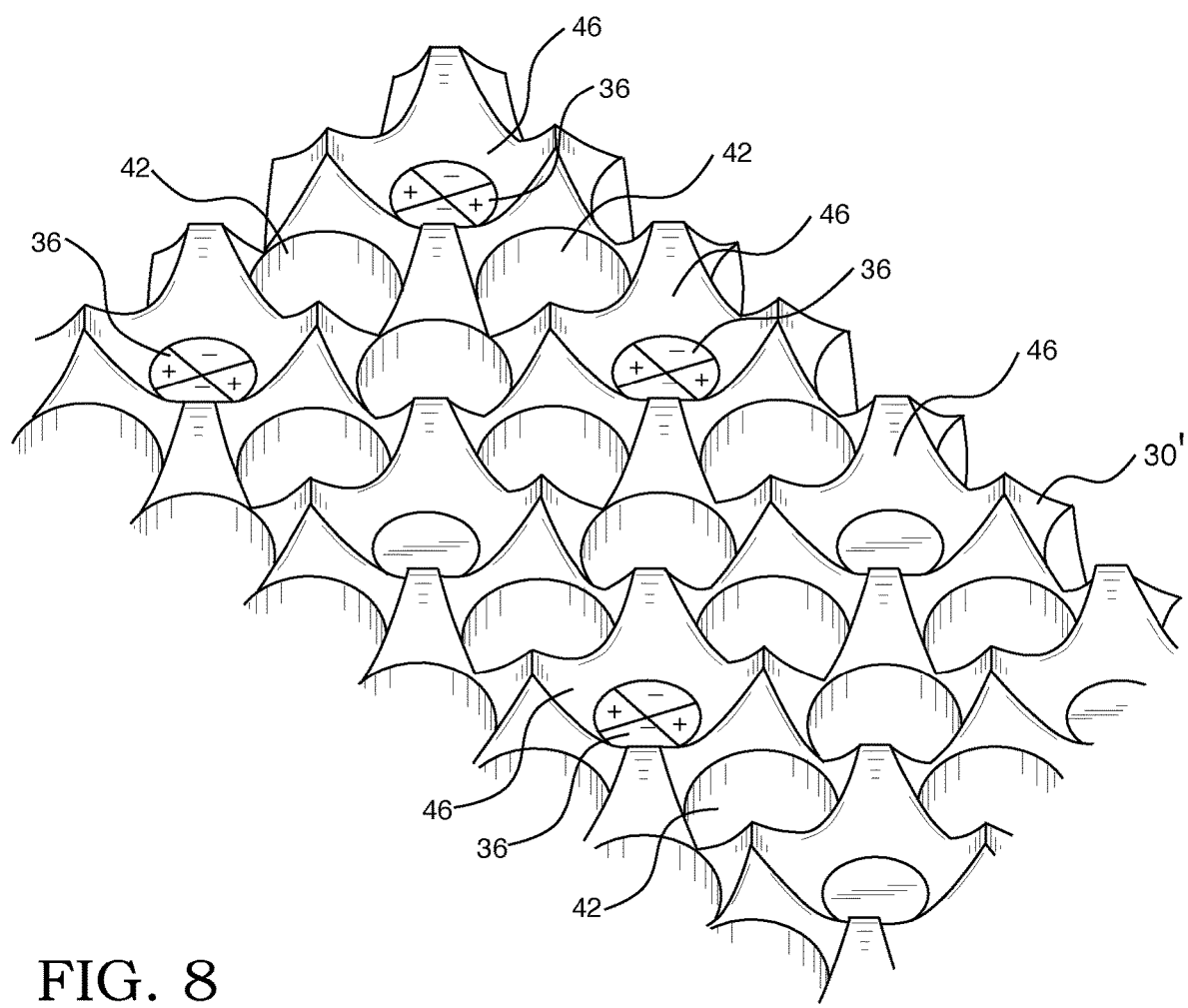
FIG. 8 is a perspective view of an alternative embodiment of a portion of a bottom plate showing printed end plug precision magnet contacts for mating engagement with a precision magnet on the end of a fuel rod (A) of FIG. 5.

In another aspect, as shown in FIG. 8, a second precision magnet 40 may be placed by suitable means, for example, by 3-D printing, in each of a plurality of spaced recessed portions 46 in a bottom nozzle plate 30', also having holes 42 in the nozzle plate 30' for coolant flow about each fuel rod 20. The nozzle plate 30' may, in certain aspects, have an egg crate-like structure comprised of the plurality of recessed portions 46 and coolant flow holes 42. Each such recessed portion 46 is configured to seat the end plug 32 of one of a plurality of fuel rods 20. The plurality of recessed portions 46 may include a floor section onto which a second precision magnet 40 is incorporated and openings around the floor that lead to venturi type openings directly below the recess 46 for coolant flow. The flow holes 42 may also form venturi type openings. In use, the first precision magnet 36 on the end surface 34 of each end plug 32 is positioned to align with precision magnet 40 on the floor of the recessed portion 46 to either attract or repel each other for locking or unlocking, respectively, the fuel rod 20 to the nozzle plate 30'. The precision magnets 36, 40 may, as described above, have paired sections of alternating patterns of positive (+) 202 and negative (−) 204 poles on each of the precision magnets which may be rotated into an attracting or a repelling alignment, or each may have a single positive (+) 202 or negative (−) 204 pole on one and a single negative (−) 204 or positive (+) 202 pole on the other, opposite the polarity of the confronting precision magnet, to attract each other to axially lock the fuel rod 20 into the recessed portion 46. Unlocking may occur by reversing the polarity of one of the two confronting precision magnets, for example, by rotating the fuel rod.

Figure 9:
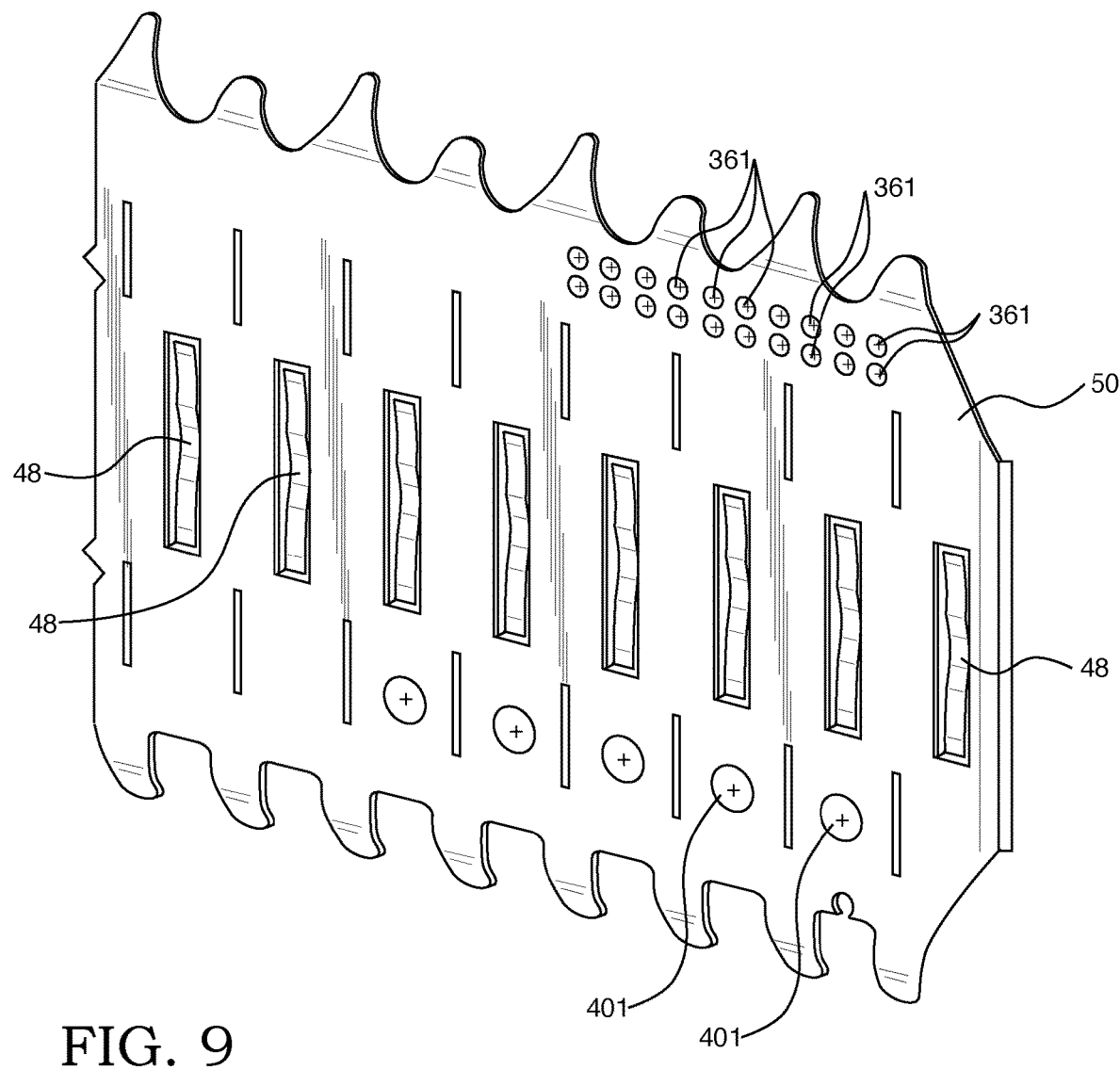
FIG. 9 is a partial view of an embodiment of a grid strap wall for a fuel rod, showing precision magnets printed the exterior of a grid strap wall to create impact resistance between adjacent grid strap surfaces at a desired gap.
Figure 10:
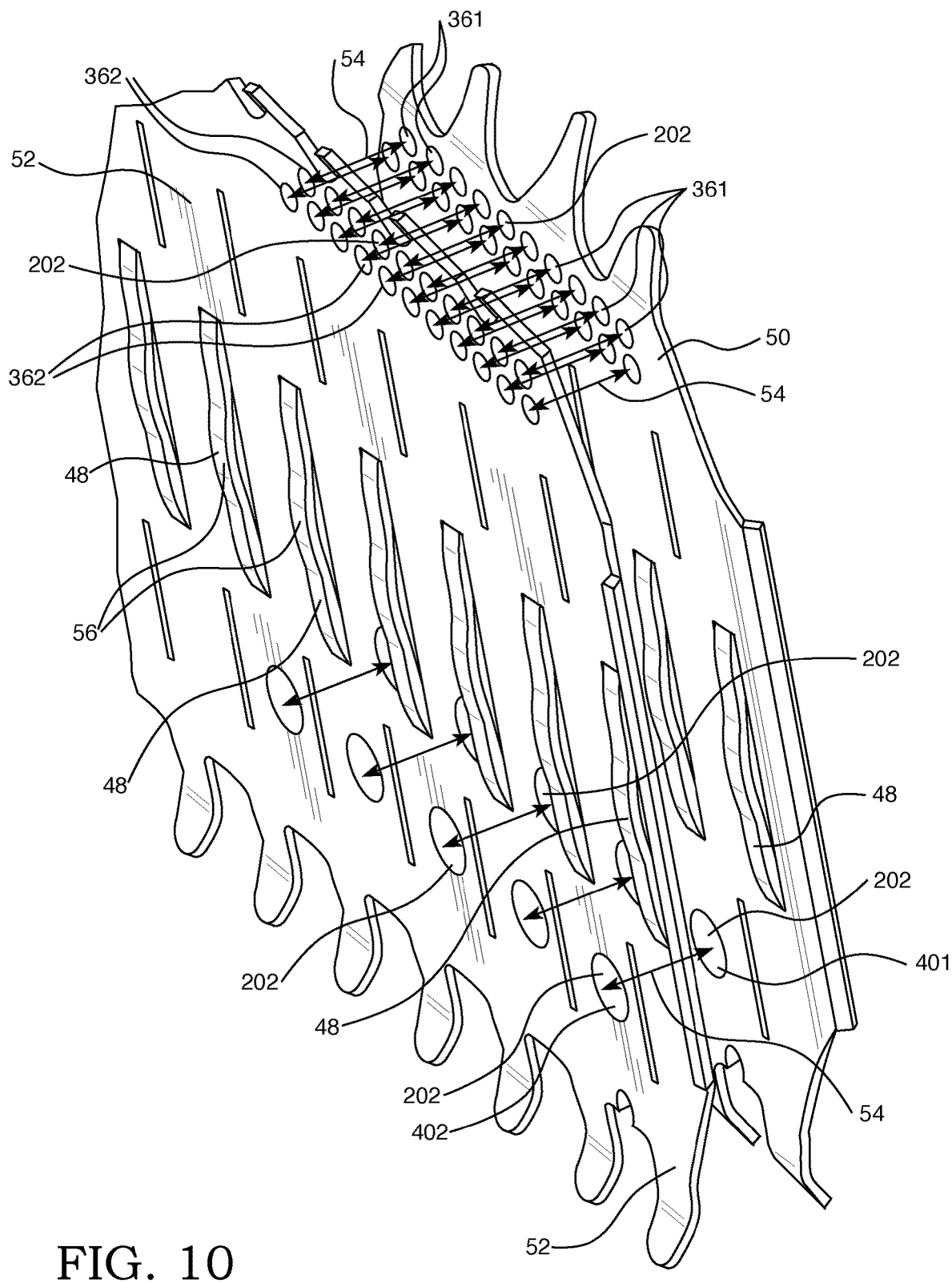
FIG. 10 is a partial perspective view of adjacent grid strap walls of FIG. 9 showing precision magnets on the exterior surface of each grid strap wall.

A conventional grid includes laterally positioned grid straps 50 that crisscross within the grid perimeter to define cells 60 through which the fuel rods 20 pass. The grid straps 50 serve to align the fuel rods 20 laterally and prevent adjacent fuel rods 20 from contacting each other. The grid straps 50 may include springs 48. The embodiment of exemplary springs 48 is shown in FIGS. 9-10. Each cell 60 may include one or two springs 48, on different sides of the grid strap sections that define the cell 60. In various embodiments, each cell may include two springs 48 or two dimples 58. The springs 48 or dimples 58 extend or arch from the grid strap wall into the cell 60 forming a raised plateau 56 which bows toward the fuel rod 20 when the rod is positioned within cell 60 such that the elevated plateau 56 of spring 48 is pressed or wedged laterally against the adjacent fuel rod 20. The springs 48 may be arranged so that at least two plateaus 56 extend into each cell 60 to laterally secure the rod 20 within the cell 60.

In certain aspects, when there are adjacent fuel assemblies 10, the grid design may include a first set of grid straps 50 on the perimeter of one fuel assembly 10 and a second set of grid straps 52 on the perimeter of the adjacent fuel assembly 10 on each grid 68, 88, and 18. The second set of grid straps 52 are positioned adjacent the first set of grid straps 50 to define a space between adjacent grid strap walls 50, 52. Adjacent grid strap walls are positioned in planes substantially parallel and spaced from each other.

In certain aspects, shown in FIGS. 9 and 10, precision magnets 361 and 401, keyed to precision magnets 362 and 402, may be incorporated into the exterior surfaces of adjacent grid straps 50, 52 of the first and second sets for lateral impact dampening to maintain a distance between the adjacent fuel assemblies 10. A novel grid design for accident tolerant fuel configurations may add one or both sets of precision magnets 361, 362 and 401, 402, incorporating them into the outer surfaces of the grid straps 50, 52 during the manufacturing process. Manufacture of the grid straps 50, 52 may, for example, be by any suitable known 3-D printing method or any other process for forming a molded three dimensional product or surface. Precision magnet patterns may be printed, for example, into the adjacent areas of grid straps 50, 52 to create resistance at a pre-determined distance or gap 54 between the outer sides of adjacent grid straps 50, 52. The gaps 54 reduce seismic and loss of coolant accident forces without the need for external features on the grid straps that may cause damage to the fuel rods 20 held within the cells 60 in the event of unplanned movement of any significant force. When each aligned pole 202 or 204 of the opposing precision magnets 361, 362 and 401, 402, respectively, is of the same polarity, the grid straps 50, 52 will repel each other and resist impact. By controlling the strength of the magnetic field generated by the precision magnets 361, 362, 401 and/or 402, the distance 54 between the exteriors of adjacent grid straps 50, 52 can be controlled and maintained under adverse conditions.

Figure 11:
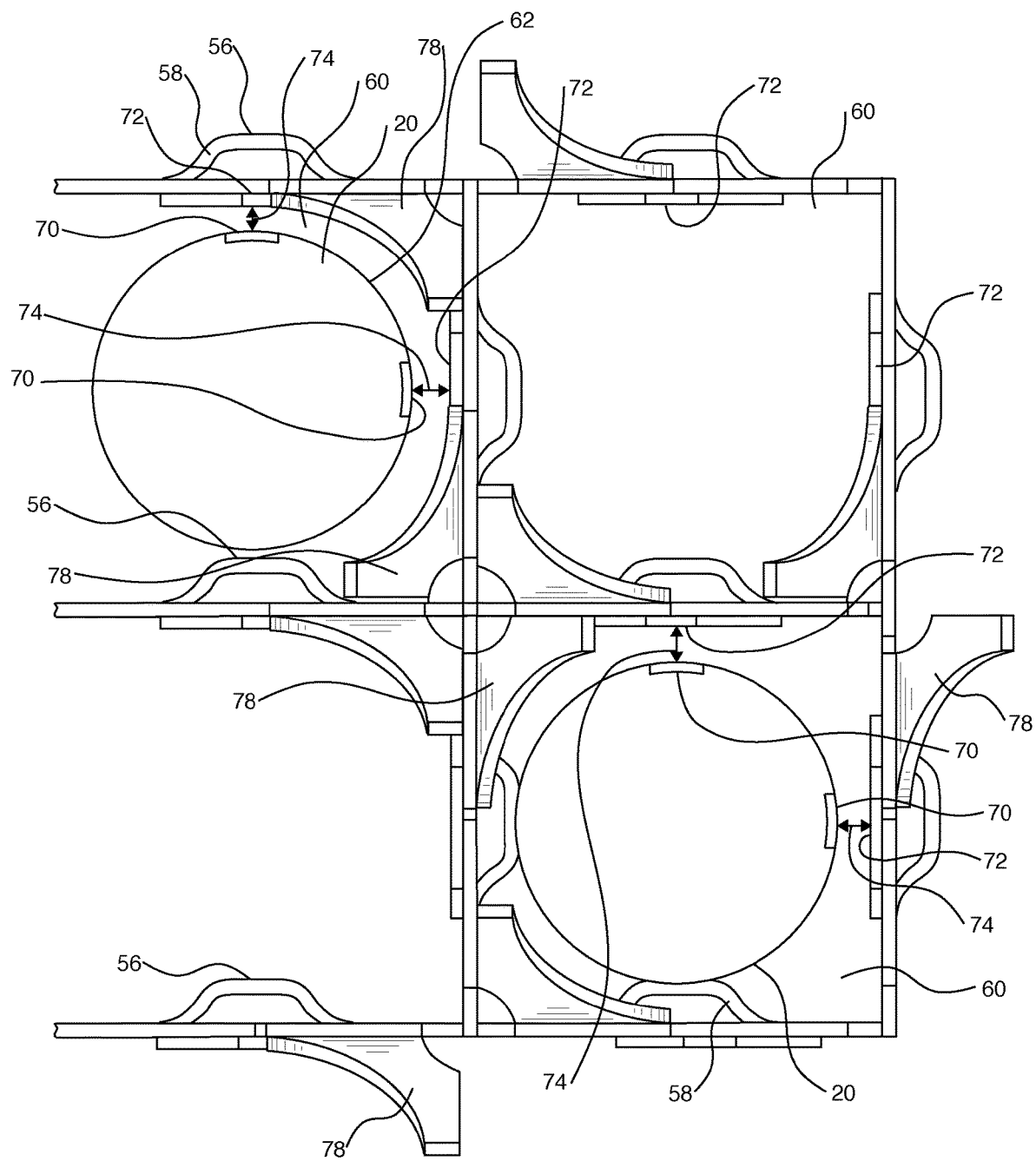
FIG. 11 is a top plan view of fuel rods in an embodiment of a grid assembly showing both precision magnets and stabilizing dimples for lateral positioning of the fuel rods.
Figure 12:
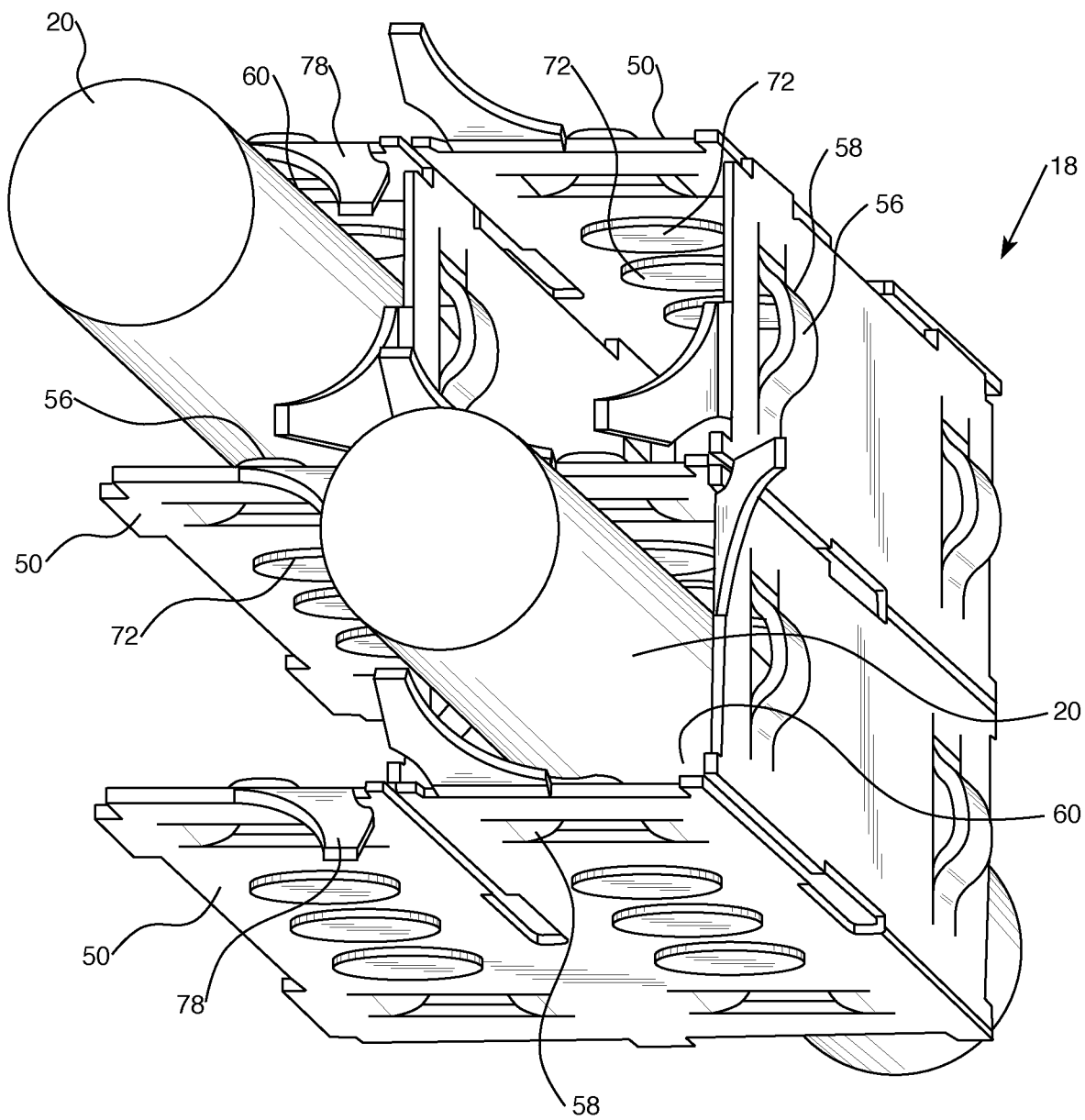
FIG. 12 is a perspective view of the fuel rod assembly of FIG. 11.

Referring to FIGS. 11-12, an alternative fuel rod lateral positioning configuration is shown that incorporates precision magnets 72 into the inside of the cells 60 and confronting precision magnets 70 on the fuel rods 20. Precision magnet patterns may be incorporated into the interior side of grid strap walls 50 in place of or in addition to dimples 58, which align fuel rods 20 within the grid cells 60. A thin sleeve 62 can be attached to the fuel rod 20. The sleeve 62 may in various aspects, be printed with the opposite magnetic pole from the pole incorporated into grid strap 50 at some or all grid 68, 18, or 88 elevations within the system 10. As shown, the repelling force of the confronting like-pole precision magnets (i.e., each of the confronting precision magnets having positive (+) poles 202 or each of the confronting precision magnets having negative (−) poles 204) maintains a desired gap 74 between the fuel rod 20 or a sleeve covering the rods 20. This arrangement will provide a significant grid-to-rod fretting margin because there would be much less (if any) rod 20, 24 contact support required.

Referring to FIG. 11, cells 60 defined by grid straps 50 are shown in an alternative arrangement from the grid strap arrangement described above and shown in FIG. 10. Each cell 60 also includes mixing vanes 78 for controlling coolant flow around rods 20. Coolant flow runs parallel to the rods 20.

Figure 13:
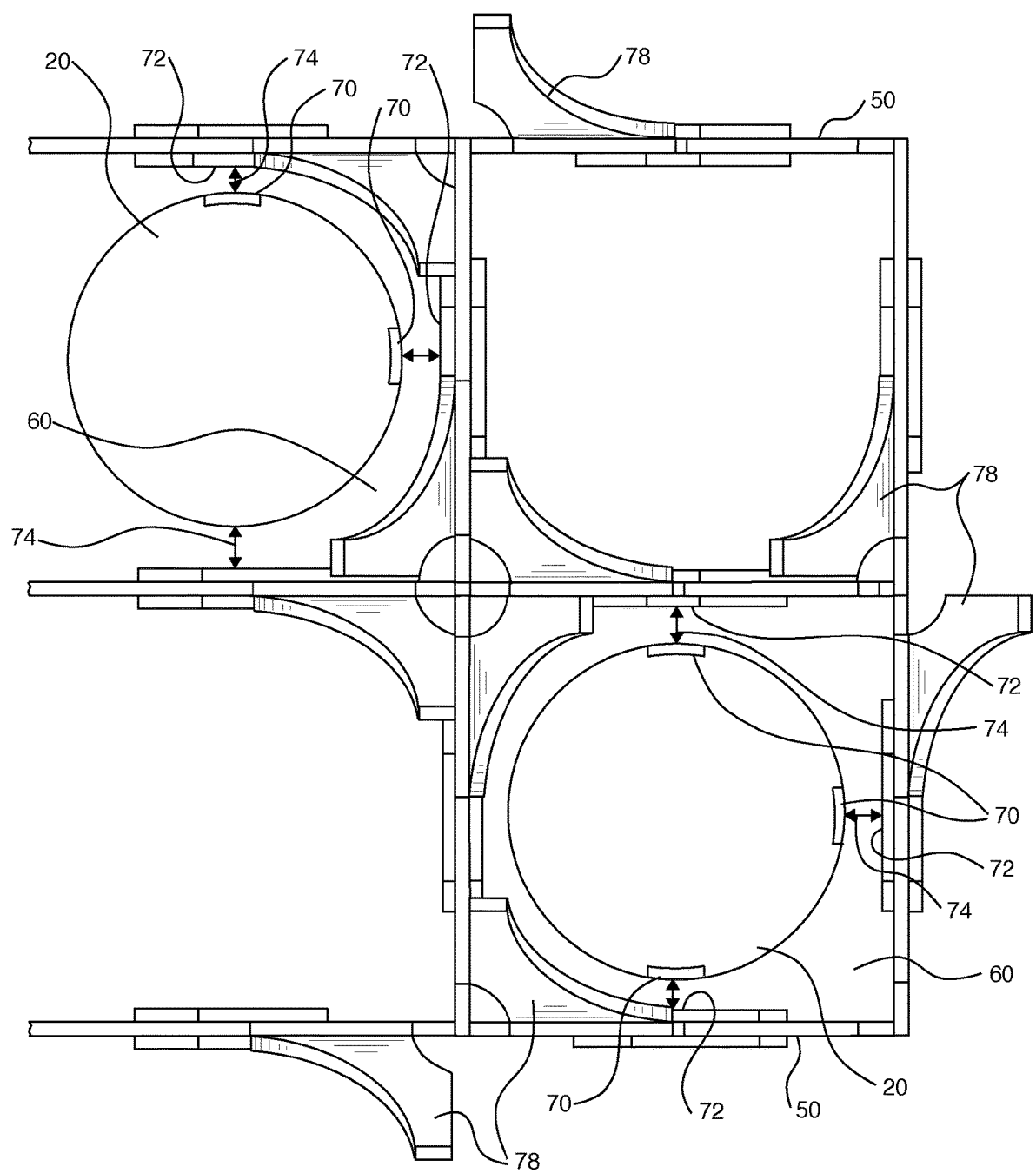
FIG. 13 is a top plan view of fuel rods in an alternative embodiment of a grid assembly showing only precision magnets on the interior of the enclosure and the fuel rod for lateral positioning of the fuel rods.
Figure 14:
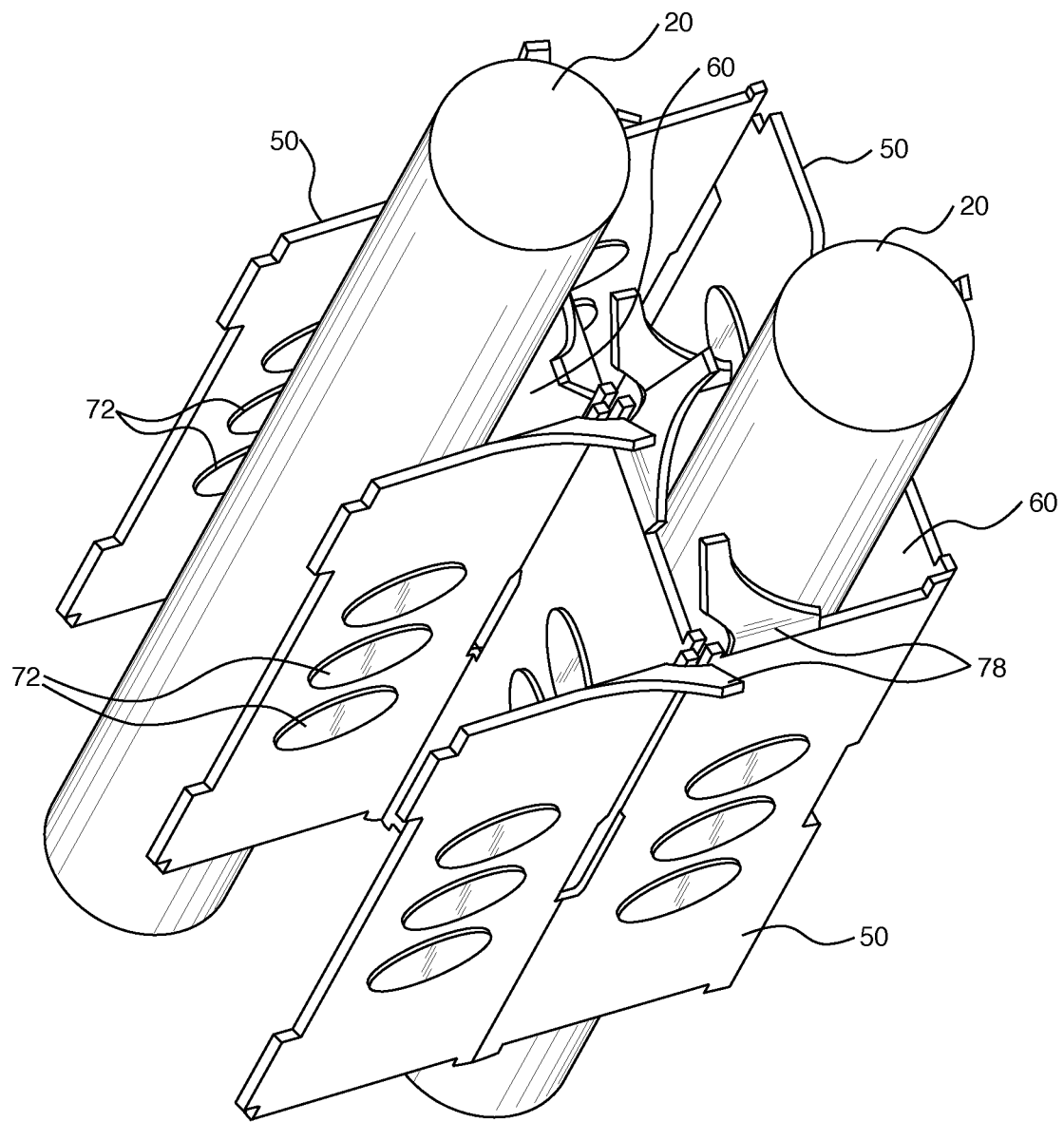
FIG. 14 is a perspective view of the fuel rod assembly of FIG. 13.

In certain aspects, as shown in FIGS. 13-14, dimples 58 may be eliminated as a retention means from cells 60 so that precision magnets 72 on the interior of grid straps 50 and precision magnets 70 on rod 20 or a rod sleeve 62 provide the sole means of maintaining the separation, gap 74, between the rods 20 and grid straps 50 within each cell 60.

A significant cost savings can be gained by combining and eliminating components. Components can be more easily controlled and result in a cost savings by removing tightly tolerance features such as springs and dimples in sheet metal components. There will be less pressure drop in coolant flow resulting in increased fuel efficiency and a higher burn-up. Movements between fuel assemblies and fuel rods that may occur in accident conditions can be better controlled, preventing damage due to sudden impacts between adjacent components. The use of precision magnets for maintaining lateral rod position control provides contact free retention. This provides more clearance between the fuel rods and other components, improving wear because debris will not be trapped against the fuel rods.

The improved retention features described herein create opportunities to simplify structural components and, importantly, create safer fuel designs for use in higher seismic locations.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A retention and alignment system for nuclear fuel rods comprising:
   an upper nozzle plate and a lower nozzle plate;
   at least one nuclear fuel rod having an upper end and a lower-most end and extending axially along a longitudinal axis between the upper and lower nozzle plates;
   at least one first precision magnet incorporated onto the lower-most end of the at least one nuclear fuel rod; and
   at least one second precision magnet incorporated onto the lower nozzle plate in a position confronting the at least one first precision magnet along the longitudinal axis, the first precision magnet having at least one of a magnetic north or south polarity and the second precision magnet having at least one of a magnetic south or north polarity opposite the polarity of the confronting first precision magnet to effect magnetic attraction between the confronting first and second precision magnets.

2. The retention and alignment system recited in claim 1 wherein each of the at least one first and second precision magnets has at least one paired section, each section of the pair having a polarity opposite the polarity of the other section of the pair, wherein the polarity of each section of the pair is selectively switchable to the opposite polarity to selectively switch one of the first or second precision magnets from a locked configuration wherein confronting precision magnet sections attract each other to an unlocked position wherein confronting precision magnet sections repel each other.

3. The retention and alignment system recited in claim 2 wherein each of the at least one first and second precision magnets has at least a second paired section, each second paired section having a polarity opposite the polarity of the other second paired section, and the polarity of the opposing sections is switched by rotating one of the first and second precision magnets to position the second paired section of a section of one of the first and second precision magnets opposite the first paired section of the other of the first and second precision magnets such that opposing sections have the same polarity.

4. The retention and alignment system recited in claim 1 wherein each of the at least one first and second precision magnets has at least one paired section, each section of the pair having a polarity the same as the polarity of the other section of the pair, wherein the polarity of each section of the pair is selectively switchable to the opposite polarity to selectively switch one of the first or second precision magnets from a locked configuration wherein confronting precision magnet sections attract each other to an unlocked position wherein confronting precision magnet sections repel each other.

5. The retention and alignment system recited in claim 4 wherein each of the at least one first and second precision magnets has at least a second paired section, each second paired section having a polarity the same as the polarity of the other second paired section, and the polarity of the opposing sections is switched by rotating one of the first and second precision magnets to position the second paired section of a section of one of the first and second precision magnets opposite the first paired section of the other of the first and second precision magnets such that opposing sections have the opposite polarity.

6. The retention and alignment system recited in claim 1 wherein each of the at least one first and second precision magnets comprises a plurality of paired sections, each section of a pair within the plurality of paired sections having one of the same polarity as the other section of the pair or the opposite polarity of the other section of the pair, wherein the polarity of each section is selectively switchable to the opposite polarity to selectively switch one of the first or second precision magnets from a locked configuration wherein at least a majority of the confronting precision magnet sections attract each other to an unlocked position wherein at least the majority of the confronting precision magnet sections repel each other.

7. The retention and alignment system recited in claim 6 wherein the polarity of each section is selectively switchable to the opposite polarity by rotating at least one of the first and second precision magnets.

8. The retention and alignment system recited in claim 1 wherein the at least one first precision magnet comprises a first precision magnet incorporated onto the lower-most end of the at least one fuel rod, wherein the at least one second precision magnet comprises a second precision magnet incorporated onto the lower nozzle plate, and wherein the first precision magnet and the second precision magnet are configured to axially retain the nuclear fuel rod between the upper and lower nozzles.

9. The retention and alignment system recited in claim 1 further comprising at least one grid parallel to and positioned between the upper and lower nozzle plates, the at least one grid defining a perimeter and having within the perimeter, a set of grid straps extending laterally and longitudinally across the grid to define at least one cell having an interior and an exterior, the at least one cell being configured to receive the at least one fuel rod passing axially through the interior of the cell;
   at least one third precision magnet incorporated onto one of the grid straps in the interior of the cell;
   at least one fourth precision magnet incorporated onto a side of the fuel rod passing through the cell in a position confronting the at least one third precision magnet, the third precision magnet having at least one of a magnetic north or south polarity and the fourth precision magnet having at least one of a magnetic north or south polarity the same as the polarity of the confronting third precision magnet to effect magnetic repulsion between the confronting third and fourth precision magnets for maintaining a gap between the fuel rod and the grid strap onto which the confronting third precision magnet is incorporated.

10. The retention and alignment system recited in claim 9 wherein there are a plurality of cells and a plurality of fuel rods, and wherein only one of the fuel rods extends axially through any one of the cells.

11. The retention and alignment system recited in claim 10 wherein each cell through which one of the fuel rods passes has at least two third precision magnets incorporated onto different grid straps of the cell and the fuel rod has at least two fourth precision magnets, each fourth precision magnet positioned on the fuel rod to confront a different one of the at least two third precision magnets incorporated onto the grid straps.

12. The retention and alignment system recited in claim 10 further comprising at least one retention member positioned in each cell to maintain the gap between the fuel rod and at least one of the grid straps of the cell.

13. The retention and alignment system recited in claim 1 wherein the lower nozzle plate comprises a plurality of cupped portions for seating the lower-most end of the at least one nuclear fuel rod, and each cupped section has one of the at least one first precision magnets incorporated therein.

14. The retention and alignment system recited in claim 1 further comprising a path for coolant flow along each of the at least one nuclear fuel rod.

15. A retention and alignment system, comprising:
an end plug, comprising:
   a boss section configured to operably couple to a fuel rod; and
   a lower-most end surface comprising a first magnet pair, the first magnet pair comprising:
      a first magnet comprising a first polarity; and
      a second magnet comprising a second polarity, wherein the second polarity is opposite the first polarity; and
a nozzle plate comprising a surface, wherein the lower-most end surface is configured to be seated upon the surface of the nozzle plate, the surface comprising a second magnet pair configured to confront the first magnet pair, the second magnet pair comprising:
   a third magnet comprising the second polarity; and
   a fourth magnet comprising the first polarity.

16. The retention and alignment system of claim 15, wherein the nozzle plate and end plug are configurable between an unlocked configuration and a locked configuration.

17. The retention and alignment system of claim 16, wherein the end plug is rotatable relative to the nozzle plate to transition the end plug and the nozzle plate between the unlocked configuration and the locked configuration.

18. The retention and alignment system of claim 16, wherein the nozzle plate and end plug are configurable in the unlocked configuration based on:
   the first magnet confronting the fourth magnet; and
   the second magnet confronting the third magnet.

19. The retention and alignment system of claim 16, wherein the nozzle plate and end plug are configurable in the locked configuration based on:
   the first magnet confronting the third magnet; and
   the second magnet confronting the fourth magnet.

20. A retention and alignment system, comprising:
an end plug, comprising:
   a boss section configured to operably couple to a fuel rod; and
   a lower-most end surface configured to be seated on a surface of a nozzle plate, wherein the lower-most end surface comprises:
      a first pair of magnets comprising a first polarity; and
      a second pair of magnets comprising a second polarity;
wherein the nozzle plate comprises a third pair of magnets comprising the second polarity and a fourth pair of magnets comprising the first polarity;
wherein the first pair of magnets is configured to magnetically couple to the third pair of magnets; and
wherein the second pair of magnets is configured to magnetically couple to the fourth pair of magnets.

21. The retention and alignment system of claim 20, wherein the lower-most end surface of the plug comprises a first flat surface, and wherein the surface of the nozzle plate comprises a second flat surface.

* * * * *